(12) United States Patent
Malagon et al.

(10) Patent No.: US 7,945,039 B1
(45) Date of Patent: May 17, 2011

(54) OPERATOR SERVICES CUSTOMIZATION WITH ADVANCED INTELLIGENT NETWORK INTEGRATION OF A PROFILE DATABASE

(75) Inventors: Margaret Malagon, King of Prussia, PA (US); Veronica Ann Cartier, Alexandria, VA (US); Jerome Joseph Lanni, Herndon, VA (US); Ravi Narayan, Honolulu, HI (US); Sundar Rajan Padmanabhan, Irving, TX (US); Srinvas Reddy Karra, Hartsdale, NY (US)

(73) Assignee: Verizon Services Corp., Ashburn, VA (US)

( * ) Notice: Subject to any disclaimer, the term of this patent is extended or adjusted under 35 U.S.C. 154(b) by 1540 days.

(21) Appl. No.: 11/159,905

(22) Filed: Jun. 23, 2005

(51) Int. Cl.
*H04M 3/42* (2006.01)
(52) U.S. Cl. .................................. 379/218.01; 379/223
(58) Field of Classification Search ............. 379/218.01, 379/212.01, 219, 223, 265.01
See application file for complete search history.

(56) References Cited

U.S. PATENT DOCUMENTS

| | | | |
|---|---|---|---|
| 5,339,352 A * | 8/1994 | Armstrong et al. ............ | 455/417 |
| 5,699,416 A * | 12/1997 | Atkins ...................... | 379/115.01 |
| 6,795,543 B1 | 9/2004 | Cartier et al. | |
| 2005/0114642 A1 * | 5/2005 | Watson-Luke et al. ........... | 713/1 |
| 2006/0126814 A1 * | 6/2006 | Weidmark et al. ....... | 379/218.01 |

* cited by examiner

Primary Examiner — William J Deane

(57) ABSTRACT

An Advanced Intelligent Network architecture is used by a first telecommunications service provider having an operator services switch to provide enhanced call processing for operator services calls. The calls received at the operator services switch originate from a second telecommunications service provider, and the first telecommunications service provider provides custom services to the subscribers of the second telecommunication service provider. A call received at the operator services switch triggers the switch to query a control point for instructions, which in turn may query an external service parameter database. The control point instructs the switch to temporarily connect the caller to a peripheral resource providing a custom branding announcement to the caller and a menu of options from which the caller may select popular destinations. After provision of the custom branding announcement and menu, the call to the intelligent peripheral is released and the caller is routed to the appropriate service, which can be a directory assistance service.

27 Claims, 11 Drawing Sheets

OPERATOR SERVICES CUSTOMIZATION WITH ADVANCED INTELLIGENT NETWORK INTEGRATION OF A PROFILE DATABASE

BACKGROUND OF THE INVENTION

The telephone network's primary service has been to provide Plain Old Telephone Service (POTS), which involves the establishment of telephone connections between two users. Another category of services is operator services (OS), although these are typically provided less frequently.

The category of operator services originally referred to services provided by a human operator, but with current automation, many operator services are now provided by automated systems, without necessarily involving the caller interacting with a human. Callers requesting an operator can do so by dialing "0" without any further digits or numbers (this dialing procedure is abbreviated as "0–"). In the past, callers could also access a human operator by prefixing a "0" to the number being dialed (abbreviated as "0+"). Originally, human operators handled a variety of requests and provided various services, but very soon their functions were segregated. For example, many years ago, directory assistance (DA) services were initially obtained by the caller dialing 0–. Subsequently, special numbers for DA calls were defined so as to facilitate segregation of these types of calls. Thus, DA calls are now identified by special telephone numbers e.g., "411" or "555-1212". DA services are now largely automated, as are most other operator services. However, DA calls are still considered within the umbrella of operator services and calls to 411 can be considered an operator services call.

There are various other operator services. Other operator services include alternate billing services (ABS), which are now automated and commonly known as "calling card" services. ABS calls require the caller to enter a billing number identifying an account for which the call is to be billed (as opposed to traditionally billing the call to the account associated with the originating telephone number). Other operator services, such as station-to-station or person-to-person calling have been automated to an extent. These services may involve a call completion (CC) operator which controls the completion of the call to the destination party.

The provision of operator services was traditionally performed by the Local Exchange Carrier (LEC) on behalf of its local telephone customers. Thus, each LEC would typically have work centers staffed with operators dedicated to certain services, such as DA or CC type services. The advent of new technology allows the operators to be physically spread apart, but collectively, they may still be considered as a logical work group. Other work groups may be defined to handle calls for other related telecommunication services, such as repair related issues, customer service, payment, etc.

With the separation of local telephone carriers from interexchange carriers (IECs or IXCs), operator services were provided both by the LECs and IECs. Although the scope of services provided was limited to the customers of the respective LEC or IXC, it was recognized that increased efficiencies could be obtained by allowing services to be 'outsourced.' In other words, the technology and staff associated with providing operator services for one carrier could be used to provide services for another carrier. Thus, the infrastructure, technology, and staff used to provide a particular capability for a first carrier or service provider could be expanded and form the basis of an operator service that could be sold to a second carrier or other service providers. In this manner, other service providers could provide the same sophisticated operator services without the required large capital investments for the facilities, technologies, and staff.

Wireless service providers (WSPs) are one example of service providers for which this arrangement was attractive. Originally, many WSPs started with small subscriber bases dispersed in various locations. WSPs desired to provide various types of operator services for their subscribers, but at the same time desired to avoid the capital outlay required to do so. Thus, WSPs would frequently 'contract out' such services on behalf of their mobile subscribers. Other service providers, including wireline providers (such as competitive LECs-CLECs), would contract out services as well.

However, Operator Service Providers (OSPs) typically cannot customize the operator services for any particular purchaser of operator services. By way of illustration, if LEC "A" provides an operator service (such as DA) to two service providers (e.g., WSP "B" and WSP "C"), then the same exact DA service will be provided to the callers of both service providers. In many cases, a WSP "A" may desire custom feature or 'branding' (e.g., a short announcement provided to the caller announcing the service) in order to distinguish it from WSP "B". This allows a WSP to provide unique features for their subscribers. Further, from the caller's perspective, unique features or branding appears as if their WSP has the sophistication to directly provide such services.

The technology used to implement operator services is complex and difficult to change. Any modifications to an operator service switch requires the switch vendor to develop new software, which is a time consuming and expensive. Typically, because there are different vendors involved, the different vendors' equipment must interwork to properly accomplish a new or modified service, and coordination of the development of a new capability is further complicated. To date, the ability of operator services providers to customize service operation, whether for the own operation or for providing the service to other carriers, is complicated and expensive.

Therefore, systems and methods would be desirable to facilitate the provision of custom operator services and/or features to callers of an operator services provider.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF THE INVENTION

Figure 1:
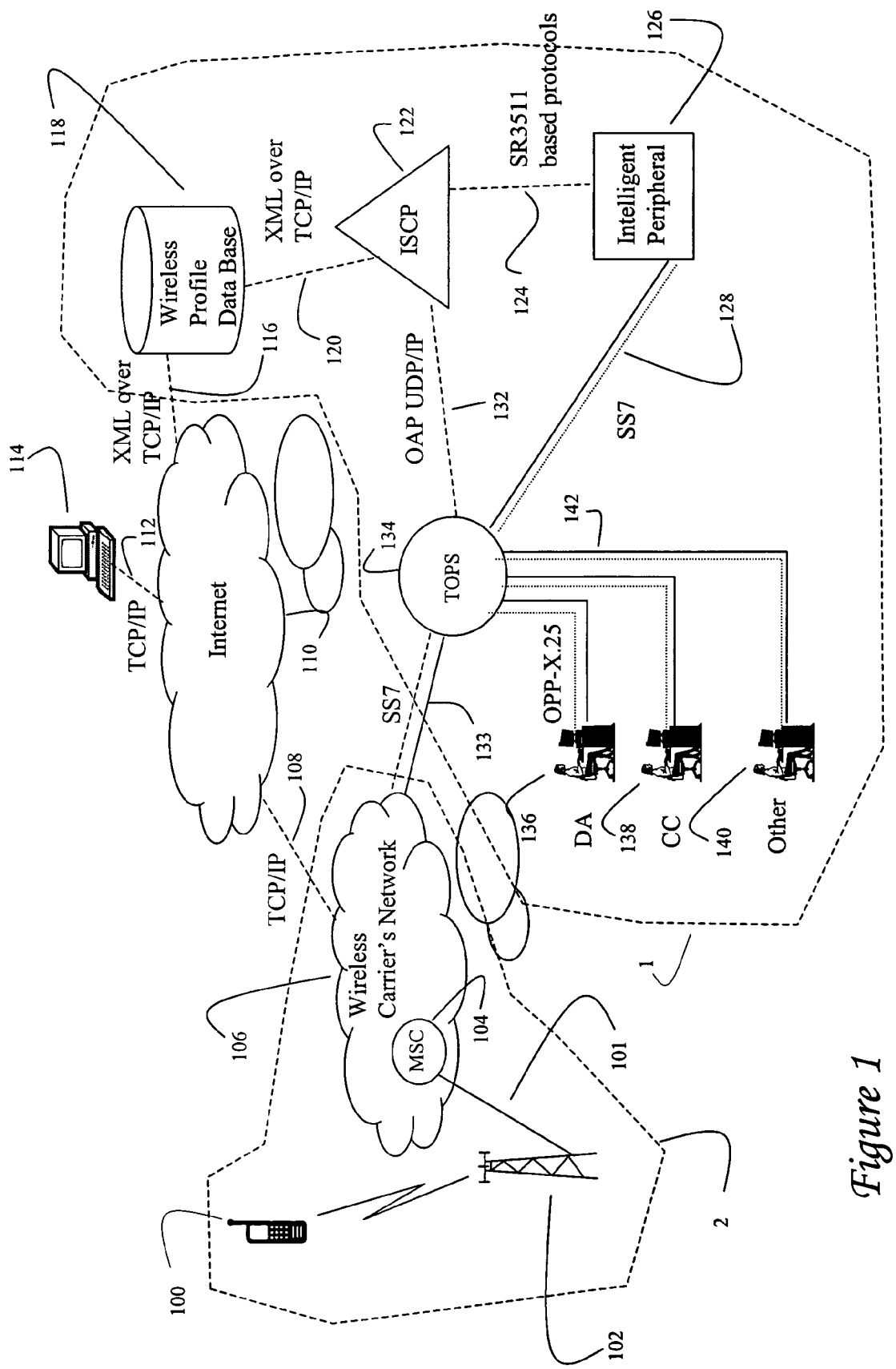
FIG. 1 illustrates the components in the architecture in one embodiment used to illustrate the principles of the present invention.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The ability to provide operator services is well known in the art. Typically, a telecommunications service provider, such as a local exchange carrier (LEC) provides such services to their customers. Some LECs have deployed Advanced Intelligent Network (AIN) capabilities to provide enhanced capabilities in association with operator services. One example of this can be found in U.S. Pat. No. 6,795,543. In that patent, calls received by an end office with AIN capabilities (called a Service Switching Point—SSP) cause the end office to access a control point, embodied as an ISCP, to provide flexible operator services. Such architecture is capable of allowing a LEC to provide enhanced operator services to its subscribers. However, such architecture is not readily adaptable if the LEC is an operator services provider (OSP) to an operator services consumer (OSC).

As used herein, "operator services" is to be broadly construed, and is not limited to traditional operator services, but includes enhanced operators services. "Operator services" includes other forms of information services, which are typically provided in conjunction with a traditional operator service, but may include only the information services. Any of the services that can be provided to a caller dialing "411" are intended to be within the scope of "operator service." As will be seen, information services such as sport scores, news events, traffic information, etc. are all forms of information services intended to be within the scope of the present invention.

The traditional architecture is not readily adaptable for providing operator services to other carriers for calls that originate from another carrier. Operator service calls from the other carrier are not typically routed first to the LECs SSP and then to the OSS. Thus, without the SSP involved, the AIN capabilities are bypassed. One alternative is for the OSP to forward operator services call received at an OSS to an SSP. At that point, the SSP may use its AIN capabilities to provide the operator service. However, this results in double trunking and consumes additional resources between the SSP and OSS. This is undesirable and requires non-OSS switch resources to be used to provide operator services. Rather, it is desirable to use AIN or AIN-like capabilities in the OSS. However, these capabilities are customized for providing operator services and different from the AIN capabilities defined for end-offices. Thus, the procedures defined for providing enhanced operator services for callers served by an SSP are not sufficient to provide the enhanced services from calls originating from another carrier received at an OSS.

In embodiments of the present invention, AIN-like capabilities of an OSS are used to provide custom operator services to calls originating from another carrier. Turning to FIG. 1, one embodiment of the present invention is illustrated. There are various network elements that may be involved in the operation of the invention, and FIG. 1 illustrates only one configuration. The principles of the invention are not limited to access by wireless users, but can be access by other CLEC users, regardless of access technology (e.g., wireless or wireline).

The principles of the present invention rely on a programmable capability provided by the AIN-like capabilities. As such, the network resources, network elements and their functions, and call flows can vary according to a specific embodiment. Further, call flows vary based on the service definition, particular circumstances associated with it invocation, and selection of implementation options by the network operator. Those skilled in the art of advanced intelligent network design will appreciate the flexibility and variability afforded by the technology.

Turning to FIG. 1, at a high level there is an operator services provider (OSP) 1 that provides the operator service. An operator services consumer (OSC) 2 receives the benefit of the service. The OSP could be a LEC that provides other services, but the OSP could also be a provider whose only business is providing operator service. The OSC is illustrated as a WSP, but the OSC could be any other type of telecommunications provider, wireline or wireless, and could be a facilities-based provider or a reseller. A facilities-based OSC typically owns the facilities for providing services to their subscribers, but in some embodiments the OSC could lease another carrier's equipment (including the equipment of the provider associated with the OSP). Thus, in some embodiments the end-users receiving the benefit of the service could be using the facilities of the OSP, but be viewed as subscribers of a separate service provider, which would be the OSC.

In this context of FIG. 1, the OSC is a separate facilities-based network provider making the service available to their subscribers, specifically, a mobile subscriber 100. The mobile subscriber 100 could be considered as the ultimate consumer of the operator service.

The architecture illustrated is not intended to restrict or imply any type of billing arrangement that may occur for use of the operator service between the OSP 1, the OSC 2, and the ultimate user of the service, the mobile user 100. Thus, a variety of billing arrangements are possible, including billing the mobile user 100 directly by the OSP, or billing the mobile user 100 by the OSC 2 (the WSP), which in turn is billed by the OSP. In other arrangements, the service may be provided for free to the ultimate user and/or subsidized via promotional information services provided to the caller.

The OSC is illustrated as comprising a WSP providing service to a mobile user 100. The wireless handset is in radio contact with a wireless tower 102, which in turn is typically connected via trunks 101 or microwave links to a mobile switching center (MSC) 104. The MSC may be one of several switches (not shown) in the wireless carrier's network 106. The particular details of the internal architecture of the OSC 2 are not relevant.

The wireless carrier in this embodiment is shown as having both data connections 108 to the Internet as well as voice connections 133 to the operator services provider 1. In the case of connections to the Internet, the wireless carrier's network is typically connected to the Internet 110 by a data connection transmission facility 108. (Data oriented facilities are shown using a dotted line while voice oriented facilities are shown using a solid line. Although the technology used to convey and process voice may be similar or identical to that used to process data, this distinction is a convention to aid in distinguishing the functionality of the facility being discussed.)

The connection from the wireless carrier's network to the Internet is not required to practice the principles of the present invention during the processing of a call. The Internet connection may be used by the wireless carrier to administer data in the wireless service profile database. The connection from the mobile user 100 allows the user to access resources on the Internet 110, and typically utilizes a TCP/IP or related protocol 108. In some cases, the protocols may be adapted for mobile users.

The wireless carrier's network 106 is connected to an operator services switch (OSS). One common embodiment is a Traffic Operator Position System (TOPS) 134 which is a feature of the a Northern Telecom DMS-200 switch. TOPS is designed to provide operator services. For example, the TOPS switch provides additional control capabilities for operators to join and disconnect calls. The TOPS switch allows a call to be 'held' in the TOPS switch and selectively connected and released with call legs that are connected to other resources for the purpose of providing certain functions. A call leg can be viewed as a call in its own right, which is then selectively joined with another call leg (or call) to effect the desired purpose. For example, the TOPS switch can connect a caller to an announcement machine, a speech recognition processor, or some other technical resource based on a particular function that is needed at that time during the call. Further, the TOPS switch can perform a sequence of such actions on a given call. Thus, a call received by the TOPS switch can be connected with a call leg established to an announcement machine to play a special announcement followed by releasing the call leg and establishing a second call leg to a speech recognition processor that is connected to the caller.

The TOPS switch 134 is connected to the WSP carrier's network 106 using voice trunks along with SS7 signaling 133, although other forms of interconnection can be used. Signaling System 7 (SS7) is a well known protocol for controlling call setup over a trunk group between switches of different network providers. The trunks may connect the TOPS switch directly to the MSC 104 serving the wireless user, or may connect a separate MSC in a tandem connection arrangement with the serving MSC (not shown).

The TOPS switch typically has various operator groups connected to it. In FIG. 1, one group of operators 136 is shown as providing DA services. Each operator position typically has resources in the form of a keyboard and display device, and other technology such as speech recording or speech recognition capabilities. In addition, the operator position typically has a specialized functional terminal for looking up requested listings and controlling transfer of the caller to an announcement machine, which uses speech to text technology to play the requested telephone number. Each operator position is illustrated as having both voice and data connections 142 from the operator position to the TOPS switch. Other embodiments may use a LAN or other presently available technology for providing data communications with the operator position. In some embodiments, the operator service is accomplished using speech recognition components at the operator position and no human operator involvement is required. In other embodiments, operator involvement is used in limited circumstances. The principles of the present invention can be adapted to work in a variety of DA configurations.

Another group of operators 138 may provide various call completion services, including person-to-person calls, collect calls, etc. Other operator groups 140 may be enlisted to provide other services or a subgroup of call completion services. Still other operator services may be provided, such as ABS services (not shown), which typically are fully automated or provide routing to resources such as sport scores, movies or other information The operator services positions 136-140 may be segregated into different physical locations, or may be co-located in common work centers. Although only one TOPS switch is shown, an OSP may have multiple TOPS switches with certain services performed on only certain defined TOPS switches. For example, an OSP may have two TOPS switches and may allocate one TOPS switch for performing only call completion services and the other switch for providing only DA services. In other embodiments, all the services may be provided on each TOPS switch. No limitations are imposed as to how and which services are provided on the TOPS switch or otherwise restrain the embodiments designed by the OSP.

In this embodiment, the TOPS 134 has an SS7 interface (both signaling and associated trunks) 128 for voice communication with an Intelligent Peripheral (IP) 126. Although SS7 is disclosed, other types of interfaces could be used between the TOPS switch and the IP, including Voice-over Internet Protocol, ISDN, or even POTS. The Intelligent Peripheral 126 can be thought of as a group of resources available for use to the TOPS switch to service an operator services call. The IP may be used concurrently by other, non-TOPS switches (not shown) for other applications, as is well known to those skilled in the art. The resources incorporated into the IP typically include the ability to play announcements, receive and recognize DTMF (dual tone multiple frequency) signals generated by push button responses by the caller. In addition, the IP may have the capability to report what information it has detected and accept commands as to what processing is to occur in conjunction with a particular call. In this embodiment, the IP is used to play announcements and collect digits (e.g., recognize DTMF tones) as instructed. Other embodiments of an IP may utilize speech recognition circuitry to recognize user speech responses in addition to, or lieu of, recognition of DTMF tones. Typically, the announcements provided by an IP are not strictly limited to verbal messages, but generally allow any audio information (e.g., musical sounds) to be provided. Still other embodiments may use speech synthesizers or text-to-speech circuitry.

In other embodiments, a service node may be used. The term "service node" is sometimes used by those skilled in the art as an alternative name referring to an IP. In other contexts, a service node denotes an IP with enhanced capabilities. The principles of the various embodiments of the present invention can be accomplished using either an IP or service node, or other forms of equipment capable of providing the necessary functions.

The TOPS switch 134 also communicates with an Integrated Service Control Point (ISCP) 122. This communication is accomplished using a high speed TCP/IP connection and typically uses the User Datagram Protocol (UDP) capability. This communication capability is used to transfer the Operator Automated Protocol (OAP) messages. Other embodiments may use X.25, SS7, frame relay, ATM or other protocols for conveying the OAP protocol. The ISCP 122 can be considered as a database and a processor executing a program, which can be generally referred to as a "control point." The program executed is also referred to as "service logic" and defines the operation of the particular service being performed. As is known to those skilled in the art, the ISCP typically maintains data and the program logic for providing real-time control for a call. Thus, the ISCP 122 communicates with the TOPS switch 134 and the IP 126 to coordinate the actions required to complete an operator service. The ISCP is known by other names in the industry, such as a Service Control Point (SCP), intelligent database, and other names. The principles of the present invention can be accomplished using equipment from various vendors as long as the required functionality is present.

The communication between the ISCP and the TOPS switch uses a defined protocol, called an Operator Automated Protocol (OAP) to define the messages, formats, and procedures for interaction. The particular OAP capability disclosed herein is one embodiment of an Operator System Services Advanced Intelligent Network (OSSAIN) capability and is provided in the Northern Telecom DMS-200 series of operator services switches. Thus, the TOPS switch must be provisioned with the OAP capability and the ISCP must have a similar OAP interface to have useful interaction between the two entities. Other protocols (e.g., proprietary vendor's protocol or a standard protocol) could be used to practice the principles of the present invention. The OSSAIN is not the same as the AIN capability on end offices (known as service switching points—SSP).

As previously indicated, the ISCP 122 also communicates with the IP 126. This communication 124 is typically defined by a separate protocol specification, and is referred to as those skilled in the art as "SR3511," which is an interface specification defining the interaction between an ISCP and T. The ISCP is able to convey commands to the IP for performing certain actions, such as playing a certain type of announcement, or playing an announcement and collecting responses from the caller. The IP is able to report information received (e.g., DTMF digits) or other information to the ISCP. Various levels of control and interaction may be defined between the IP and the ISCP. For example, the ISCP could instruct the IF to execute a script comprising a sequence of announcements and collecting digits from the caller, or the ISCP could instruct the IP for every single action at a low level.

The ISCP 122 in turn, is able to communicate with a wireless profile database (WPDB) 118, which contains service related parameters for providing the operator service. The parameters may be defined for a wireless user and/or the OSC at the service provider level.

The wireless profile may include various parameters applicable for the wireless user. Service level parameters unique or configurable for a caller could be defined in the WPDB. For example, a wireless caller desiring language announcements in a certain language could have an indication set in their service profile in the WPDB defining the desired default language. Typically, such indications for mobile callers are indexed according to the mobile user's directory number (a.k.a. telephone number). Other parameters could indicate billing plans, service options or other technical aspects.

The WPDB 118 could also indicate parameters that are defined for the OSC at the service provider level, e.g., the wireless carrier's network 106. Thus, if a WSP desires that all menus default to English and Spanish language rather than English only, this parameter could be set. Or another WSP as a different consumer of operator services may opt to only have certain services available to their wireless users. These types of parameters are typically administered by the WSP or the OSP, but not the mobile user.

In this embodiment, the service-related data is located in a separate database, rather than stored in the ISCP. However, other embodiments could incorporate the WPDB 118 (or the data contained therein) into the ISCP, or divide the storage of data between the two entities. The communication between the ISCP and the WPDB occurs over a high speed TCP/IP connection over which XML is used, although other well known communication protocols could be used.

The service related data in the WPDB may be set (administered) in several ways. The data could be set by the OSP based on the contractual terms of the service provided to the OSC. The data could be administered by the OSC based on market related factors. Finally, the data could be administered by a mobile user. Typically, data is administered in a variety of ways based on its application and purpose. Thus, some data may be administered only by certain entities. The administration of the data in the WPDB typically uses a similar XML interface with the appropriate security mechanisms. This may occur using a computer 114 connected to the Internet 110 using any one of the well known communication methods 112.

In one embodiment, the mobile user can access and administer their wireless profile data using a home computer 114, using any of the well known methods of accessing a web site. Alternatively, or in addition, the computer 114 may be used by WSP personnel for administrating certain service parameters on behalf of the WSP or the mobile users. Finally, the wireless user may also access their WPDB service related parameters using their mobile set 100 by using any of the methods known for accessing a web site using a mobile device.

Service Definition

FIG. 1 illustrates the basic components used in this embodiment that are used to provide custom operator services to an OSC. The specific services that can be provided are varied. As illustrated above, the OSP could define English only announcements for one OSC and English/Spanish announcements for another OSC by defining the according service parameters in the WPDB. It becomes evident with this single example, that a variety of custom operator services can be provided.

In one embodiment, customer "branding" is the service provided to the caller. This is typically accomplished by playing a brief announcement, typically accompanied with tones or brief musical sounds, declaring the service provider providing the service. For example, a mobile subscriber of "Acme Wireless" requesting directory services could be briefly presented with an announcement stating "Thank you for using Acme Directory Services" followed by a musical jingle associated with Acme Wireless. The OSP could have similar custom announcements for other OSCs.

Other customizations could allow the caller seeking an operator service to be prefaced with information, such as the latest sports scores, weather information, lottery numbers, etc. This could be customized for each caller or carrier. Thus, a caller interested in basketball scores could request an operator services call in which the initial announcement provides the home teams' latest game score. Those skilled in the art of telecommunication services will readily appreciate that other types of announcements could be provided prior to operation of the service itself.

In addition, following the branding announcement (or in lieu of), the user could be presented with a menu of service options. The menu could facilitate service selection by the caller on an automated basis, allowing the OSP to more accurately direct the call to the desired resource. For example, the menu could prompt the caller to enter (or say) "1" for directory service, "2" for reverse directory service (e.g., in which a directory number is provided and a street address is returned), "3" or a call completion service, etc. Upon selection of an option (e.g., directory service), the system could prompt the caller again, such as "Press "1" for residential directory assistance, or "2" for business directory assistance." Those skilled in the art will recognize that numerous configurations and embodiments employing such menus can be defined.

When the front end interaction is completed, the call is then completed as appropriate. If the call is for directory services, the call could be completed to an automated system or to one of several operator services positions. Calls for other operator services could be routed to the appropriate operator service, based on various factors including where the available OSP network resources are located. For example, the OSP may offer different service levels for different wireless carriers as indicated in the WPDB.

Figure 2:
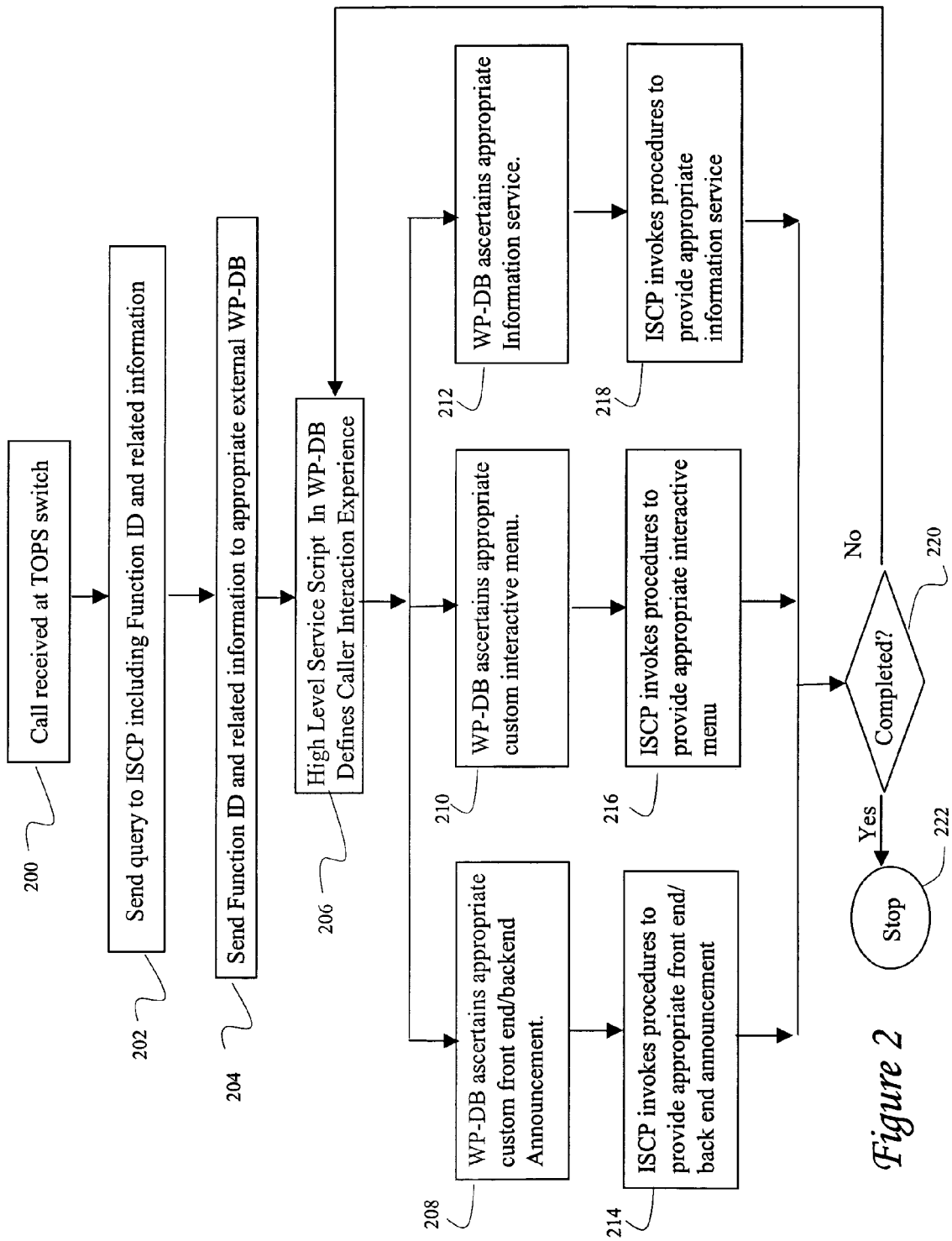
FIG. 2 illustrates various service related capabilities that can be used to provide a custom operator service.

Because the architecture used is flexible, and allows a variety of capabilities to be defined, there are various services that can be provided. FIG. 2 illustrates one embodiment of the high level capabilities or components that can be assembled to provide custom services. In FIG. 2, the process begins when the OSC carrier routes a call (typically in response to the end-user dialing 411) which is received at the operator or TOPS switch 200. The TOPS switch is provisioned to suspend routing of the trunk, and launch a query to an ISCP which includes a message containing a Function ID and a Trigger Profile Index and related information 202. The Function ID provides information to the ISCP so as to determine how the call is handled. Other embodiments may use other information elements, which can accomplish the same purpose. The Trigger Profile Index provides information to the ISCP to determine the OSC's identity and the message includes the Mobile Identification Number (MIN) of the calling party. The identity of the OSC can be conveyed in a number of ways, including by mapping a specific trunk to a carrier identifier, which can occur in the TOPS switch or the ISCP. In any case, the ISCP typically knows the identify of the WSP handed off the call to the OSP.

The ISCP uses this information to identify which WPDB contains the information relevant to the services to be provided to the caller. It is possible that a single external WPDB may used, in which no determination is required. Other OSPs may utilize several external WPDBs. This may be for reliability, loading, or capacity issues. In other embodiments, it is even possible the WPDB may be owned and operated by the OSC, or could be integrated or tightly coupled with the ISCP. Regardless, in step 204 the ISPC typically sends the information received to the appropriate external WPDB Once received in the WPDB, the WPDB next determines at a high level the service script associated for the caller 206. There may be only one service script, or there may be various high level service scripts defined for various markets, users, times of day, or other criteria. For example, an OSC may define an English-only language script indicators for markets in rural areas and certain cities, but may define English/Spanish language script indicators for other areas where Spanish speaking subscribers are more prevalent.

Once the service script has been identified, the WPDB can instruct the ISCP to perform various service related capabilities. Three of the more common capabilities are disclosed, although others may be defined. The first capability is shown in step 208. In this case, the WPDB determines that a certain 'front end' or initial announcement should be provided. Again, the announcement may be unique based on the market, subscriber, time of day, etc. The WPDB then communicates the appropriate announcement treatment (usually by identifying the announcement by number) in step 214 to the ISCP.

This announcement may take various forms, such as a branding announcement, breaking local news, sports scores, promotional advertisement messages, as well as any other type of information. The information may be an OSC based parameter, or the OSC may customize the announcement for a particular market, or even for a particular end-user. Thus, any variety of demographics and data mining procedures can be used to target end-users for specific promotions and the like.

Another capability that can be invoked is shown in step 210. There, the WPDB ascertains that a specific Interactive Voice Response (IVR) script be executed. This identifies a series of voice prompts and based on the caller's response, further scripts or functions may be invoked. Again, the WPDB may select a default script, or one based on the subscriber, market, or other factors or combinations thereof. The WPDB then communicates the selection to the ISCP in step 216.

The interactive scripts may reflect a variety of services, including the aforementioned operator services provided by the OSP, as well as other types of services offered by other entities, including movie schedules, call handling where the purpose of the call is ascertained through menu functions, and the like. The information services may involve extensive user-interaction, in which the system analyzes user's keypad depressions and/or speech responses.

Finally, another type of capability that the WPDB may invoke is shown in Step 212. Here the WPDB determines to provide a specific information service. This may be provided by an external entity (e.g., external to the OSP), or may be information service, such as one of the aforementioned operator services provided by the OSP. Again, the WPDB may select the service based on various criteria and communicates this to the ISCP.

The interactive services may involve a variety of services, including bank-at-home, remote shopping, contest registration, etc. These information services may involve interactive menus, so that the distinction between the information service and custom interactive menus may not always be distinct.

In these embodiments, the WPDB typically provides a numerical indication of the particular announcement, script, and/or information service. Various protocols and formats could be used to indicate the information and one embodiment uses the XML language over the Internet for communicating the appropriate information. The WPDB provides the information to the ISCP which then coordinates the various network elements for accomplishing the service. In this manner, the WPDB is shielded from the network specifics, whereas the ISCP must be aware of the intricacies of the procedures required to carry out the service.

The call processing in FIG. 2 shows that if the service is not completed in step 220, the logic may loop around and invoke another capability. Although this is illustrated in FIG. 2 as returning control to the WB-DB, in other embodiments, the ISCP may be providing the supervisory control by invoking various announcements, IVR scripts, and/or information services.

Figure 3:
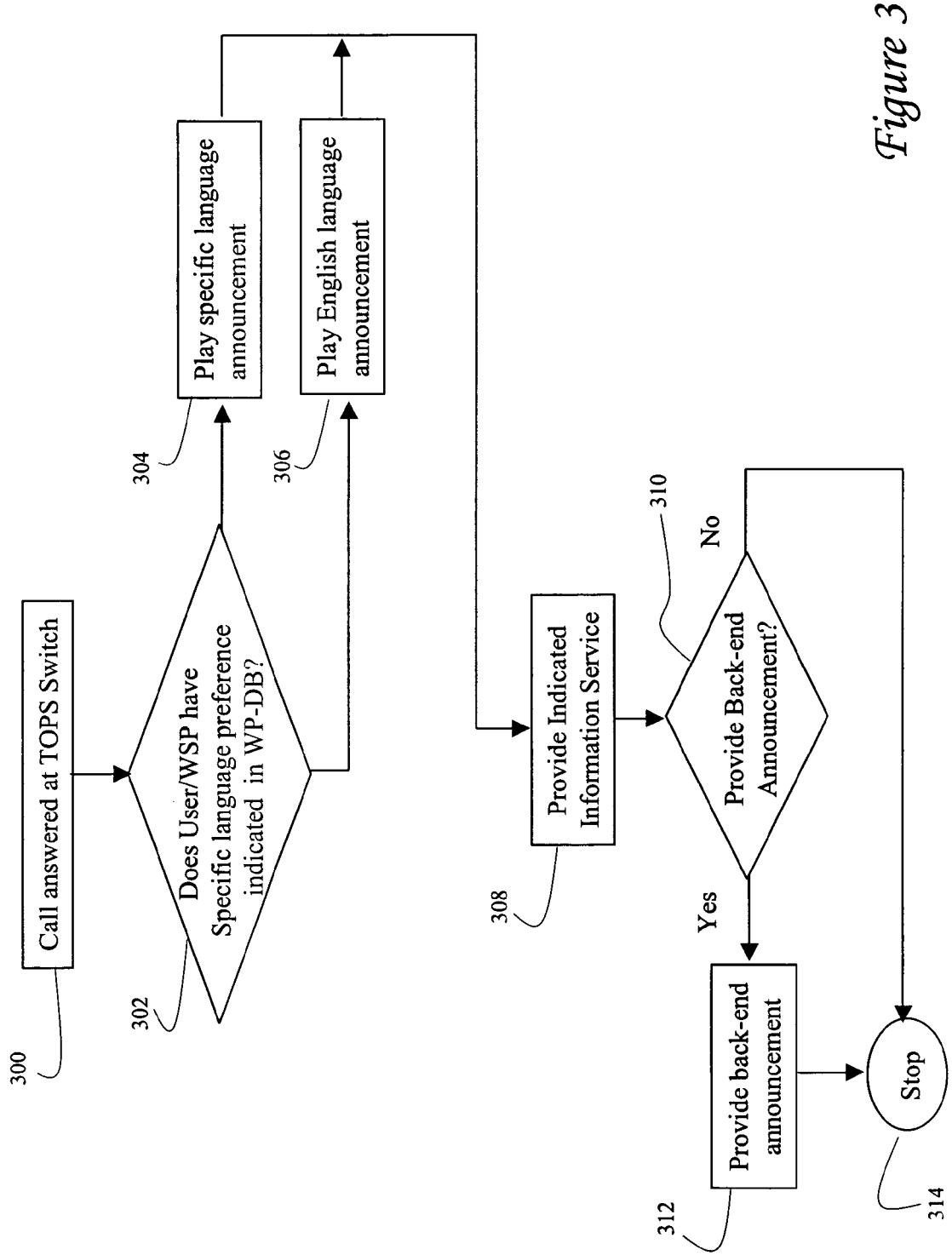
FIG. 3 illustrates various processing capabilities that can be used to provide customer operator services.

FIG. 3 illustrates one embodiment of a specific service logic that can occur using the principles of the present invention. In this service example, an announcement is provided to the caller in a certain language, after which an information service, such as Directory Assistance is provided. Following the information, a "back-end" announcement may be played. In FIG. 3, the call is answered by the TOPS switch 300. The TOPS switch queries the ISCP, which in turn queries the WP-DP as described in FIG. 2. In this embodiment, the service is defined to allow provision of either English or another specified information service. The WPDB provides this indication in step 302 regarding which language is to be used. Next, the appropriate announcement is selected. This may be in English 306 or in some other language specified 304. Next, the defined information services 308 are to be provided may mirror the language indicator previously determined. Finally, a 'back end' announcement 310 may be applicable, which if so, the announcement is played 312 or otherwise the service is completed 314.

Figure 4:
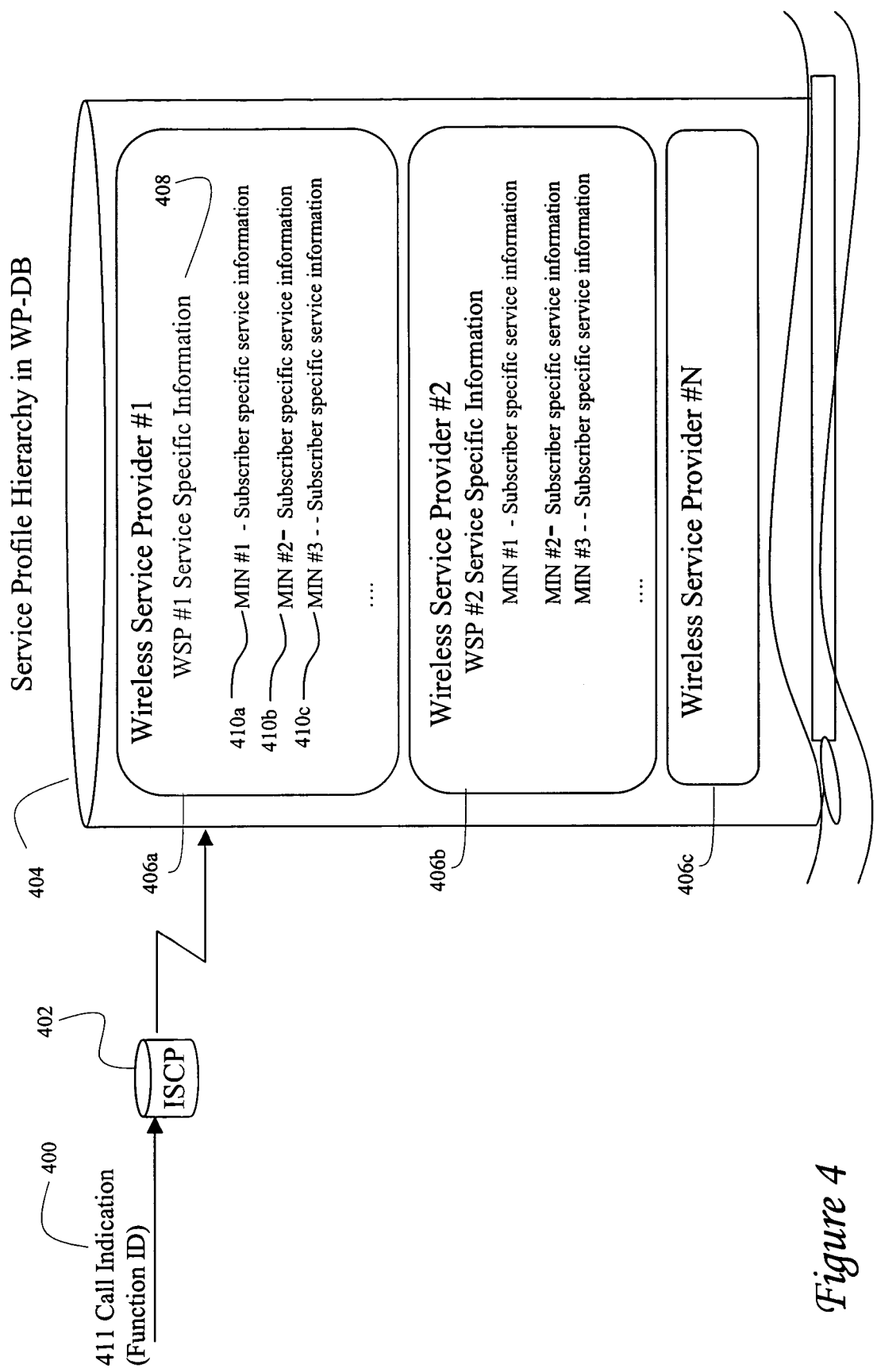
FIG. 4 illustrates one embodiment of the service profile hierarchy in a database used to provide custom operator services.

FIG. 4 illustrates one possible embodiment of the hierarchy of data structures in the WPDB. Recall that a call received at a TOPS switch results in a query 400 to the ISCP 402. Based on the information in the query, the ISCP selects one of a potential plurality of WPDBs. In this case, it is the WPDB 404 indicated. The WPDB may contain profiles for various WSPs. Shown in FIG. 4 are WSP #1 406a, WSP #2 406b, and WSP #N 406c. Examining WSP #1 406a, it is evident that service specific information 408 (such as options, billing arrangements, etc.) is defined. This defines parameters that are applicable at the WSP level. Next, information may be contained regarding specific service parameters for subscribers, as defined by their mobile telephone or directory number. In this case, service specific information is shown for MIN #1 410a, MIN #2 410b, MIN #3 410c, and so on. This service level hierarchy provides flexibility for providing custom services to a WSP and its subscribers.

Certain of the information in the WPDB may also include data as to the entities authorized to administer the data. For example, a mobile user (e.g., MIN #1) may be able to administer service parameters for their own profile, but not for others (e.g., MIN #2). Nor could a mobile user be authorized to change Service Provider specific parameters.

Specific Service Call Flow

To illustrate a specific detailed call flow using the principles of the present invention, a simple service is defined by prefacing a directory assistance service by adding a custom branding announcement. Thus, the caller dials "411" (or whatever is required by the mobile wireless provider), hears a customer branding announcement ("thank you for using Acme directory services"), and is then connected to the DA service. No back-end announcement is provided for simplicity.

Figure 5A:
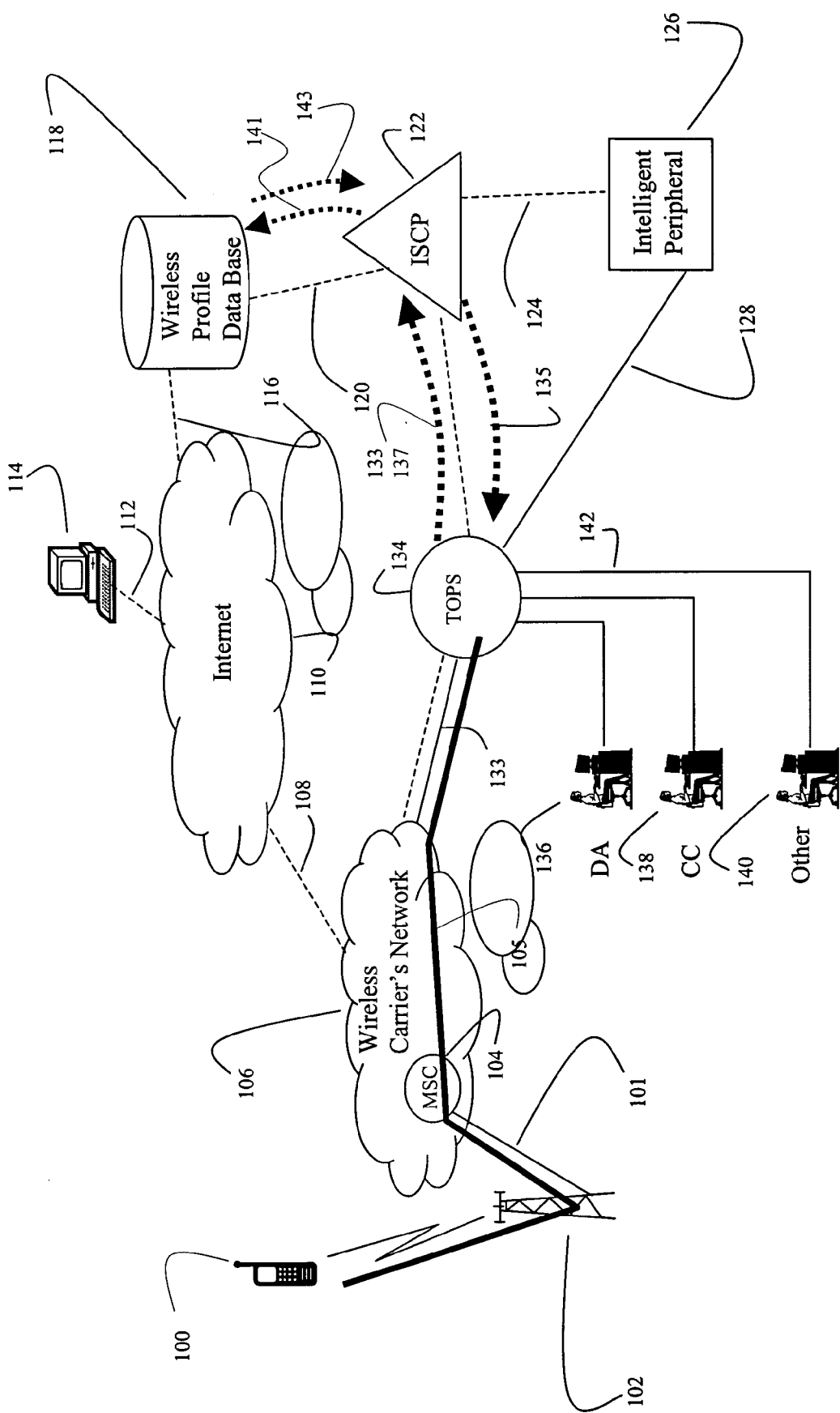
FIG. 5a illustrates one signaling flow associated with establishment of a call from a user to the TOPS switch in one embodiment of the present invention.

One embodiment of the call and signaling flow associated with the above defined service is now presented. In FIG. 5A, a wireless caller has requested an operator service, such as DA. The request for DA may be signaled in a number of ways, but the present embodiment presumes that the wireless caller dialed "411" and pressed "send." A voice connection 105 is established from the mobile user 100, via the radio tower, to the MSC 104 and onto the TOPS switch 134. The MSC determines that the call is a DA call from the digits dialed, and routes all DA calls to the OSP provider. Specifically, the WSP routes the DA call 101 to the TOPS switch using the appropriate trunk groups 133. At this point, the connection 105 from the mobile user 100 to the TOPS switch 134 is established.

Upon the call 105 arriving at the TOPS switch, an AIN call processing trigger is encountered at the Initial Call Setup Trigger Detection Point. The TOPS switch launches a query 133 to the ISCP 122 using the SessionBeginInform message. This message contains various information about the call, such as the call type, nature of the originating line, and various other characteristics. This message may provide the originating party telephone number (mobile directory number "MDN") to the ISCP.

The ISCP 122, upon receipt of the SessionBeginInform message 133, processes the message and identifies the information contained in it. The ISCP uses the information to identify the particular application process that defines the service for this call. In this embodiment, the application in the ISCP launches a query 141 to a WPDB. The query to the WPDB may include some of the information communicated via the SessionBeginInform message. For example, the MDN could be indicated, and/or an indicator of the WSP can be set as a service related parameter from the ISCP to the WPDB. Based on the information stored in the WPDB associated with the appropriate entity (e.g., mobile subscriber and/or WSP), the WPDB responds with a message 143 with the appropriate service profile parameters. In a simple embodiment, the WPDB may simply verify that the subscriber should receive a customer branding announcement. Other embodiments may involve supplemental information, such as custom service treatment, billing terms, priority level, etc.

Presuming that the subscriber and/or WSP is authorized to receive the customer DA service, the ISCP then sends a SpeechPathRequest message 135 to the TOPS switch. This message commands the TOPS switch to retain the call leg from the caller, but place the call on hold. Upon successfully completing this action, the TOPS switch responds to the ISCP using a SpeechPathSuccess message 137. If, for some reason, the TOPS switch was unable to complete this action, it would respond with a SpeechPathErrorResponse message.

At this point, the call is held in the TOPS switch and the TOPS switch is ready to receive additional instructions. The ISCP at this point knows that the caller is to receive a custom branding announcement, and the next few steps prepare the IP for involvement in the call.

Figure 5B:
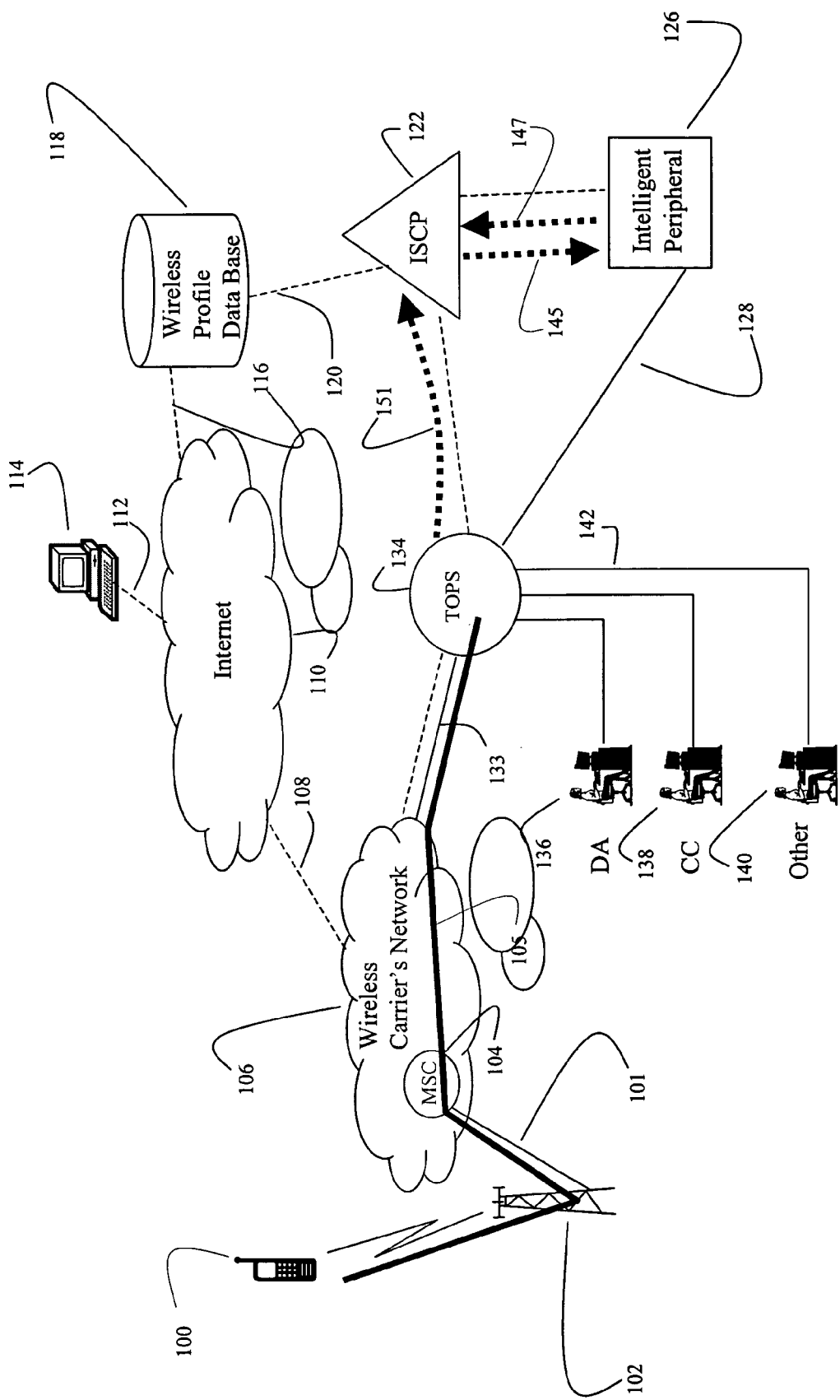
FIG. 5b illustrates one signaling flow between the ISCP and the Intelligent Peripheral (IP) for providing an operator service in one embodiment of the present invention.

Turning to FIG. 5b, the ISCP 122 must coordinate the connection of the call leg between the TOPS switch 134 and the IP 126. The ISCP begins this process by first asking the IP which port is available for use. The ISCP 122 does this by sending a SendToResourcePortRequest message 145 to the IP 126, which indicates the nature of the resources requested. Assuming that the IP has resources available, it responds with a SendToResourcePortResult message 147 indicating a directory number (e.g. telephone number) that should be used.

Figure 5C:
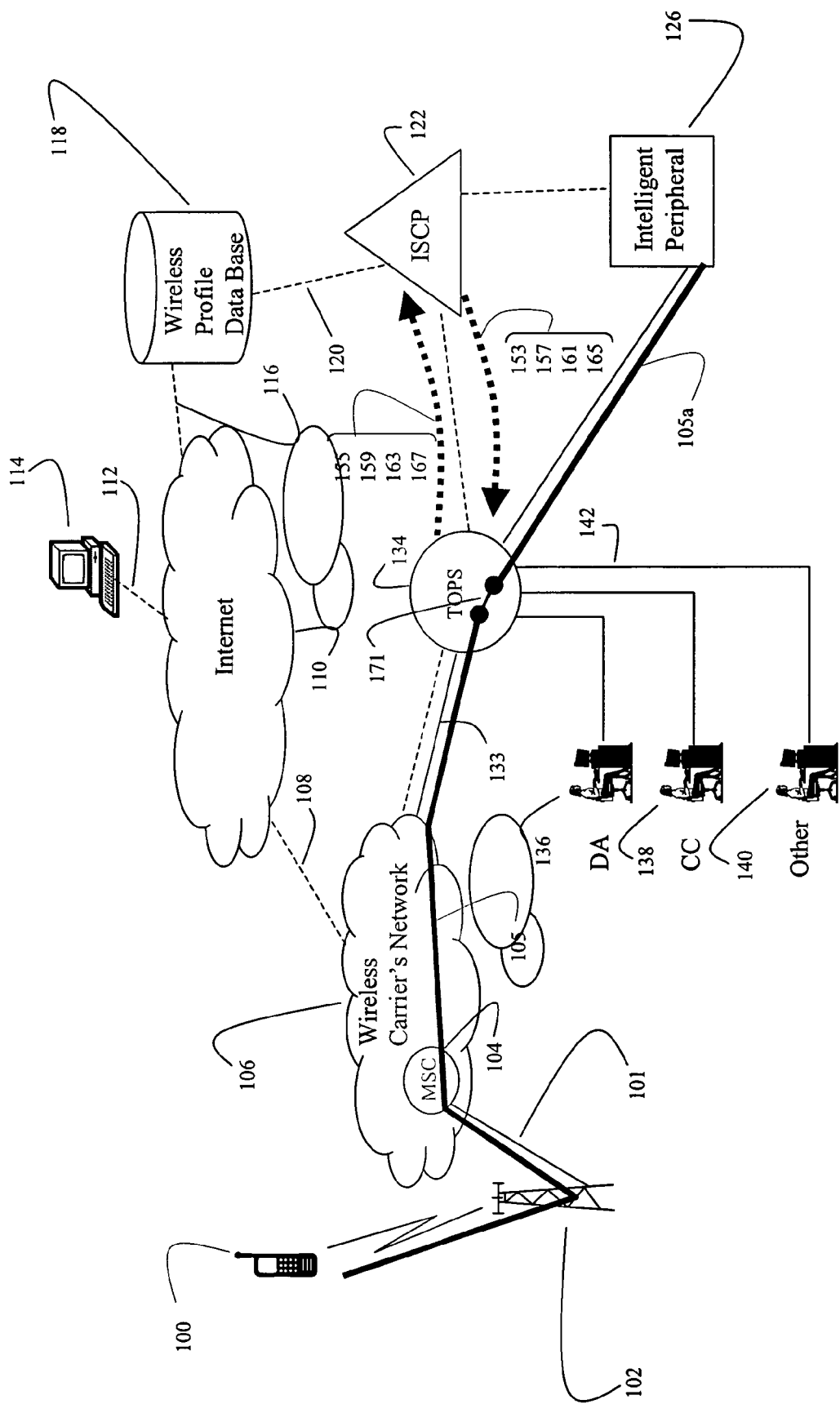
FIG. 5c illustrates one signaling flow between the TOPS switch and the ISCP for providing an operator service in one embodiment of the present invention.

The next steps involve the ISCP instructing the TOPS switch to establish a call leg to the IP using the directory number just obtained and connect the call with the call leg to the mobile subscriber. Turning to FIG. 5c, the ISCP needs to set certain parameters for the call leg that is to be established between the TOPS switch and the IP. First, the ISCP defines the calling party number that the TOPS switch should use. This allows the TOPS switch to pass information using the ISUP Initial Address Message. This is accomplished by the ISCP sending a ISUPCallingPartyNumberUpdateRequest message 153 indicating the value to be used. The TOPS switch acknowledges receipt and completion of this activity using the ISUPCallingPartyNumberUpdateSuccess response message 155.

Next, the ISCP must set the directory number (DN) that should be used by the TOPS switch when establishing the call. The ISCP provides the DN (which is the same value provided to the ISCP by the IP) using a DirectoryNumberRequest message 157 to the TOPS switch. The TOPS receives the message, and stores the DN as the destination number of the call leg that is to be shortly established. The TOPS switch acknowledges this by sending a DirectoryNumberSuccessResponse message 159 to the ISCP.

At this point, the ISCP now has the information necessary to complete the call to the IP, and is awaiting the instruction from the ISCP to do so. The ISCP then instructs the TOPS switch to place the call by sending the TOPS switch a ConnectDirectoryNumberRequest message 161. The TOPS switch then establishes the call leg 105a from the TOPS switch to the IP using the appropriate directory number and calling party number using ISUP SS7 signaling procedures. When the TOPS switch completes this action, it sends a ConnectDirectoryNumberSuccess response message to the ISCP.

Although a call leg is now established between the TOPS switch and the IP, it is not joined in the TOPS switch to the call leg from the mobile user. To accomplish this last step in establishing a connection from the mobile user to the IP, the ISCP sends the TOPS switch a SpeechPathRequest message 165, instructing the TOPS switch to join the two call legs together 171. When this is accomplished, the TOPS switch confirms completion of the action by sending the ISCP a SpeechPathSucess message 167.

Figure 5D:
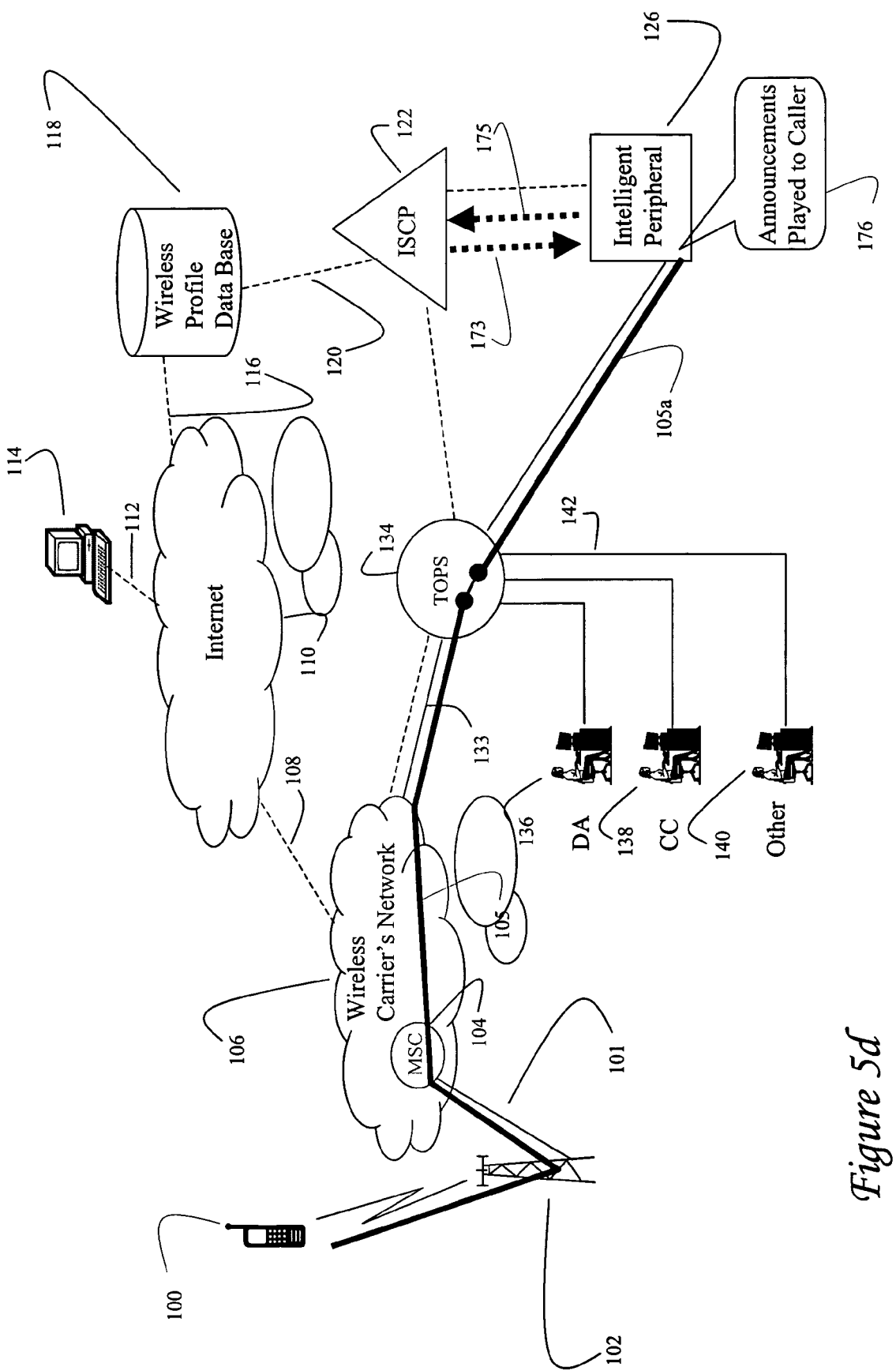
FIG. 5d illustrates one signaling flow between the ISCP and IP for providing an operator service in one embodiment of the present invention.

At this point, the caller is connected through the TOPS switch to the IP. The next steps involve the ISCP instructing the IP which actions to perform (e.g., what custom announcement to be played). Turning to FIG. 5d, the IP first must notify the ISCP of the successful arrival of the call using the CallInfoFromResource 173 message. The ISCP then commands the IP to perform a certain action. This may be to play a defined announcement or execute a defined script (e.g., a series of announcements and user responses). In this embodiment, the action is limited to playing an announcement, representing the custom DA brand. The ISCP accomplishes this by sending the IP a ExtendedInfoToResource-PlayApplication message 175. This triggers the IP to play announcements 176 to the caller, which is conveyed through the voice path 105 to the mobile user.

In other embodiments, the ISCP may instruct the IP to play an announcement and then collect a user response. This depends on the nature of the service. If the process executed in the IP collects a user response (e.g. DTMF tones or speech recognition), the information would be conveyed from the LP to the ISCP using an ExtendedInfroFromResource message. Alternatively, the message could indicate that the playing of the announcement has been completed to the caller. At this point, the ISCP could respond by directing the IP to play further announcements, and the process could reiterate a number of times. In this manner, the caller may be provided various menus, announcements, custom information, etc. In some embodiments, the caller may be informed of a specific charge for using the service. Those skilled in the art of telecommunication service design will appreciate that a variety of services can be defined.

Assuming that the branding message has been played, the ISCP determines that the caller should be directed to a particular operator service resource, which in this example is providing DA to the caller. The ISCP next instructs the TOPS switch to redirect the call to the appropriate operator position. The ISCP at this time may use various data indicating which DA work center should receive the call. (The ISCP may route the call taking into account that various work centers have different operating shifts or work loads.)

Figure 5E:
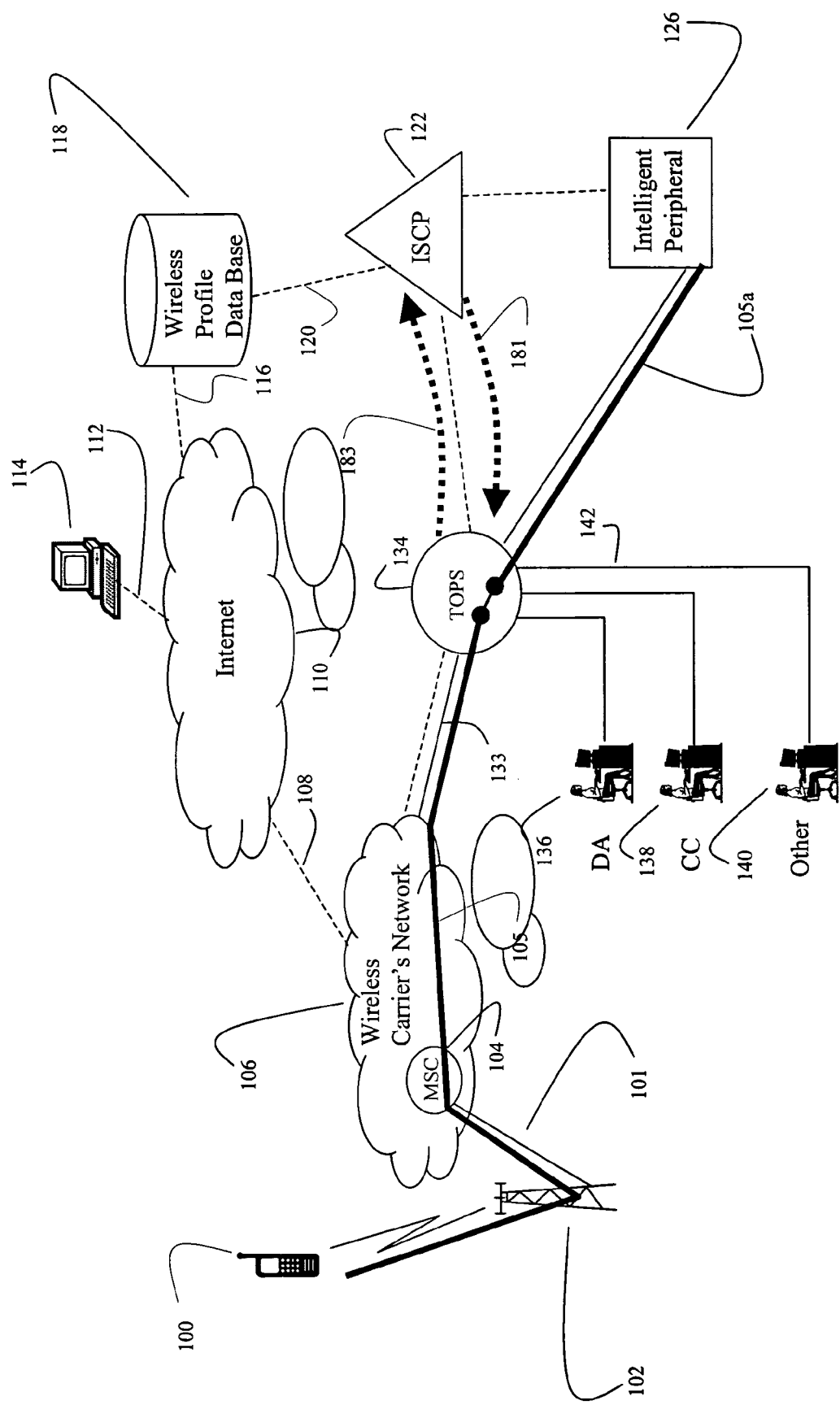
FIG. 5e illustrates another signaling flow between the TOPS switch and ISCP for providing an operator service in one embodiment of the present invention.

Turning to FIG. 5e illustrates the steps to accomplish the routing of the call to the appropriate operator services position. This involves terminating the leg 105a to the IP, resetting various call parameters, and establishing a new call leg to the appropriate DA position.

First, the ISCP sends an instruction to the TOPS switch to disconnect the call leg 105a from the TOPS switch to the IP. This is accomplished by the ISCP sending the TOPS switch a ReleaseDirectoryNumber request message 181. The TOPS switch uses the ISUP SS7 procedures to release the trunk 105a to the T. The TOPS switch confirms the release of the call leg to the ISCP by sending a ReleaseDirectoryNumberSuccess response message 183.

Figure 5F:
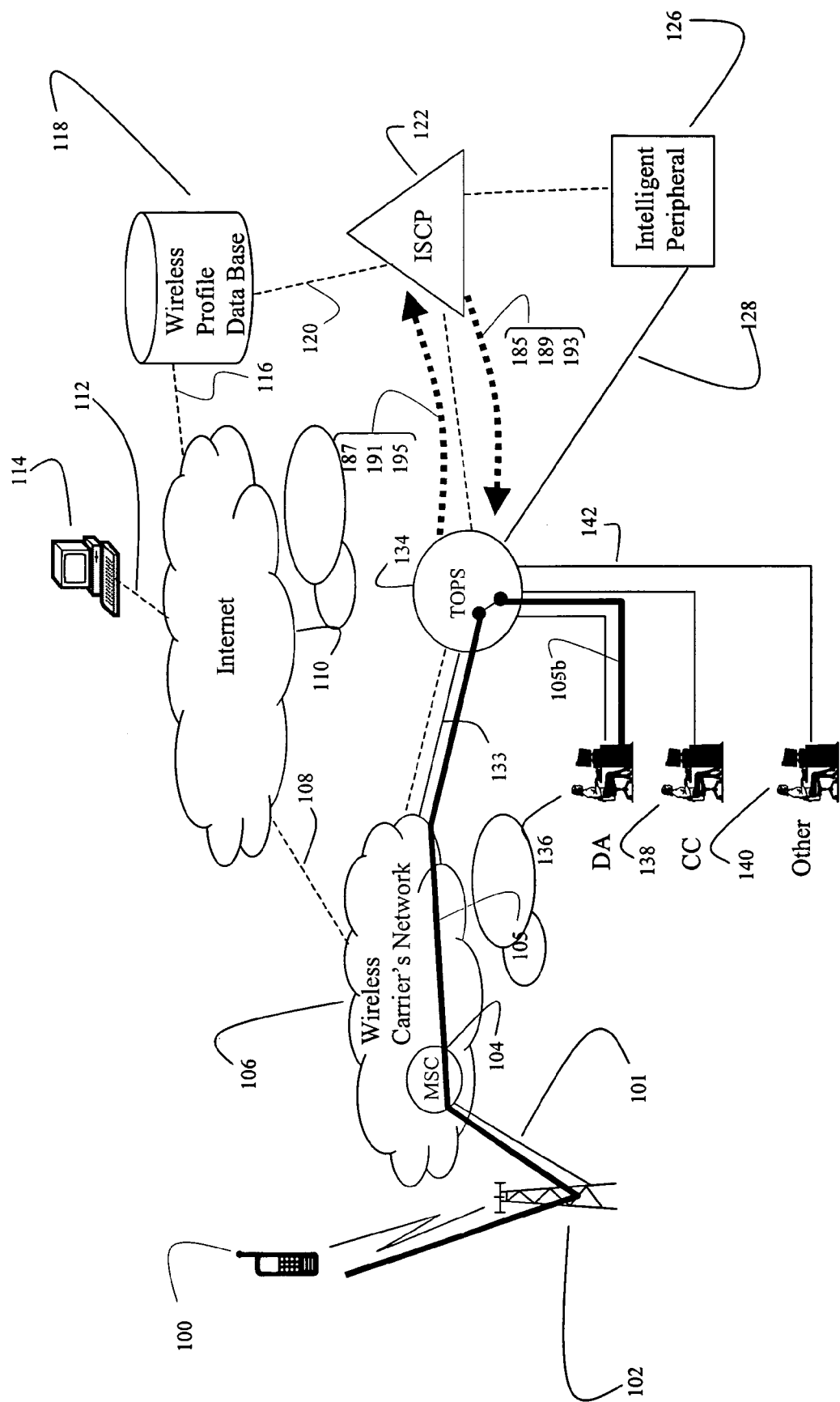
FIG. 5f illustrates the call path established between the mobile user and an operator services position for providing an operator service in one embodiment of the present invention.

At this point, the ISCP needs to instruct the TOPS switch to use certain call parameters when establishing a call to the appropriate operator services position. Turning to FIG. 5f, the ISCP accomplishes this by sending an ISUPCallingPartyNumberUpdate message 185 to the TOPS switch indicating the original calling party number and associated privacy parameters are to be used. The TOPS switch sets this value and returns a ISUPCallingPartyNumberUpdateSuccess response message 187. The ISCP then directs the TOPS switch to connect the call to an operator position by sending a PassiveFunctionProvider request message 189. This indicates the particular operator group to which the call should be completed. The TOPS switch then completes the call to the appropriate operator station using existing call setup procedures to establish the connection 105b between the caller and the appropriate operator station. When this is completed, the TOPS switch then indicates the action is completed by sending the ISCP a PassiveProviderSuccess response message 191.

At this point, the caller is interacting with the appropriate operator services station (which may be an automated system). The involvement of the ISCP is no longer required. Upon confirmation that the connection has been established, the ISCP instructs the TOPS switch to terminate this ISCP-TOPS session by sending the TOPS switch a ReleaseNodeRequest message 193. In response, the TOPS switch responds with a ReleaseNodeSuccess message 195 to the ISCP. This final action clears any state variables established with the transaction. At this point, the ISCP no longer has any knowledge or control of the transaction.

The service provided by the OSP may rely on information in the WPDB. Although use of the database is not required to provide such OSP to users, the use of the WPDB provides additional flexibility and the ability to tailor service operation for a particular consumer of the operator services (whether the consumer be viewed as the WSP or the mobile subscriber). Other embodiments may incorporate the data of the WPDB into the ISCP.

Figure 6:
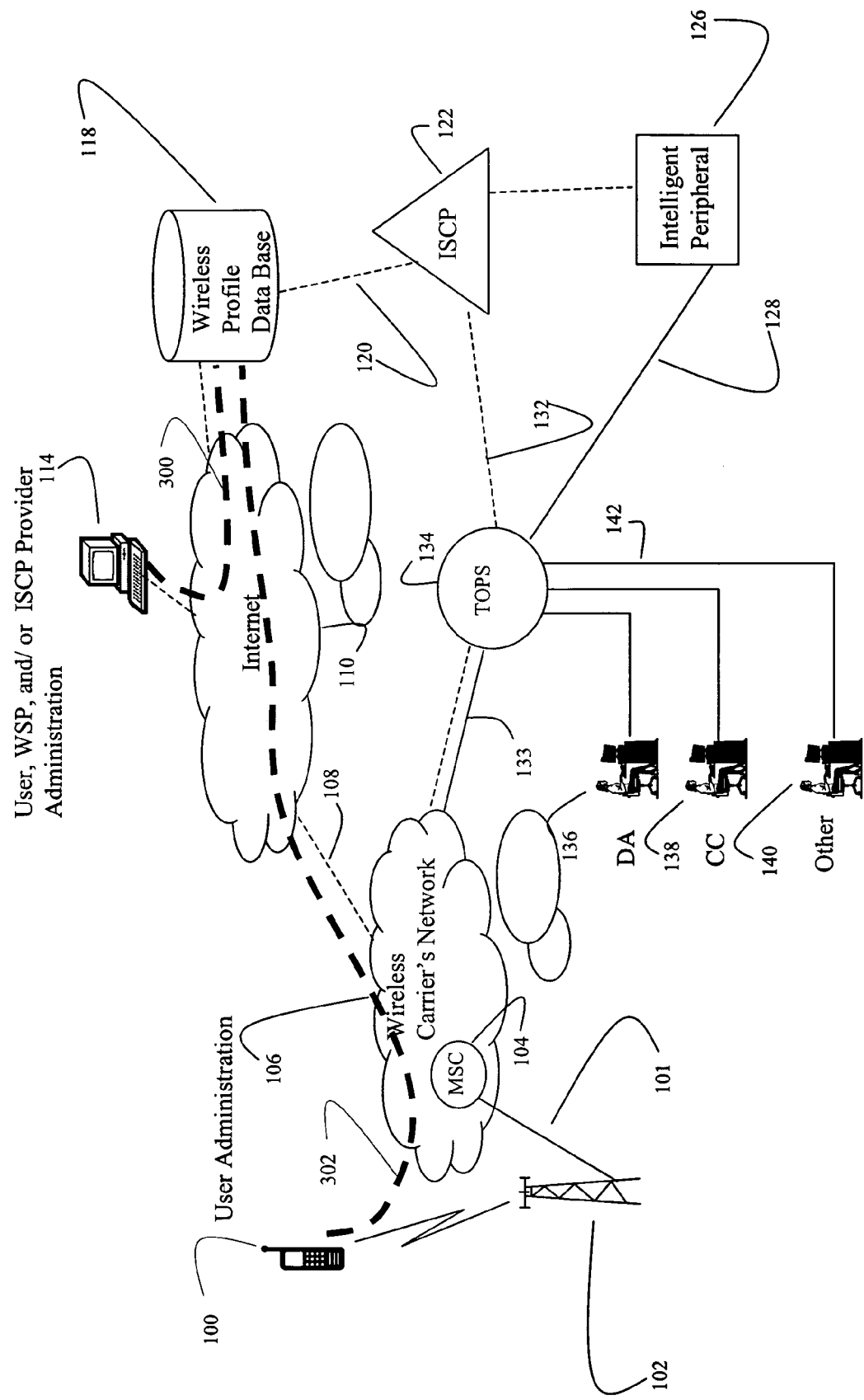
FIG. 6 illustrates possible approaches to administering data in the wireless profile database in one embodiment of the present invention.

FIG. 6 illustrates one embodiment of how the WPDB may be administered. The service related parameters can be stored in a variety of formats and one embodiment of the hierarchy of information was previously discussed. Regardless of how the information is stored, the information may be administered by WSP personnel using the Internet and a provisioning terminal 114 to establish a session 300 between the terminal and the WPDB to administer the parameters. Alternatively, or in addition to, access to certain subscriber configurable parameters may be provided to the end user themselves, either through wireline or wireless access. Thus, a user may be able to select and modify certain service options using a PC 114 or from a session 302 established between their mobile phone 100 and the WPDB 118. In any case, it is possible that the OSP may also have secure access to administer aspect of the WPDB 118.

Thus, it is possible that various entities may be authorized to change parameters associated with the service profile. In some instances the entity authorized may, under some condition, extend that authorization to its customers or affiliates. For example, an OSP may provide the ability to have dual language prompts and authorize an OSC, such as a wireless carrier to select whether this is desired. The wireless carrier in turn, may opt to allow its users to select this option. Other parameters, such a billing options, may be a subscription parameter that the OSC does not afford end users the ability to modify.

In the preceding specification, the invention has been described with reference to specific exemplary embodiments thereof. It will, however, be evident, that various modifications and changes may be made thereunto without departing from the broader sprit and scope of the invention as set forth in the claims that follow. The specification and drawings are accordingly to be regarded in an illustrative, rather than restrictive, sense.

The invention claimed is:

1. In a telephone network comprising an Operator Services Switch (OSS), a call processing method comprising:
   receiving a call from a calling party received on a trunk connected to the OSS, wherein the trunk is coupled to a wireless service provider;
   determining at the OSS using both a called party number and a trunk identifier of the trunk that a request message should be generated;
   sending the request message from the OSS to a service control point database, wherein the request message indicates at least a mobile directory number of the calling party and a first indicia;
   examining the first indicia of the request message in the service control point database to determine an address of a second database;
   sending a second request message including the mobile directory number from the service control point database to the second database;
   selecting a service script from a plurality of service scripts in the second database based in part on the mobile directory number;
   indicating the selected service script from the second database to the service control point database by conveying a first response message comprising a service script identifier from the second database; and
   sending a second response message from the service control point database to the OSS for routing the call to provide an announcement to the calling party.

2. The method of claim 1 wherein the selected service script is conveyed from the second database to the service control point using an XML-based protocol operating over an IP protocol.

3. The method of claim 1 wherein the called party number is 411.

4. The method of claim 1 wherein the first indicia indicates a trunk group identifier.

5. The method of claim 1 wherein the second database is a wireless profile database that includes service related parameters.

6. The method of claim 1 wherein selecting the service script from a plurality of service scripts in the second database is based in part on a wireless service provider identifier associated with the first indicia.

7. The method of claim 1 wherein the announcement provided to the calling party is a branding announcement.

8. The method of claim 1 further comprising the step of:
   sending a request from the service control point database to the OSS instructing the OSS to provide an information service to the calling party.

9. The method of claim 8 wherein the information service provided by the OSS is a directory assistance service.

10. A system for providing an information service, comprising:
    an operator services switch (OSS), configured to receive a call from a caller conveyed by a wireless service provider, the call is associated with a request for the information service, the OSS is further configured to launch a first message based on the call, the first message including a mobile directory number associated with the caller, the OSS is further configured to generate a first call leg in accordance with a routing instruction and connecting the first call leg with the call;
    a service control point configured to receive the first message from the OSS, the service control point is configured to identify a destination address for transmitting a second message, the second message including the mobile directory number, the service control point is further configured to receive a service script identifier for determining a set of call handling instructions including at least one routing instruction to be performed on the call, the service control point is further configured to provide the routing instruction to the OSS; and
    a second database identified by the destination address and configured to receive the second message, the second database is further configured to select the service script identifier based in part on the mobile directory number.

11. The system of claim 10 further comprising:
    a peripheral resource coupled to both the service control point and the OSS, the peripheral resource is configured to receive the first call leg from the OSS and play an announcement to the caller wherein the announcement is determined by the second message conveyed from the service control point to the peripheral resource.

12. The system of claim 10 where the OSS is further configured to connect the first call leg with a directory assistance operator services position.

13. The system of claim 10 wherein the second database is a wireless profile database communicating with the service control point using an XML based protocol.

14. The system of claim 10 wherein the set of call handling instructions comprises an instruction for providing a branding announcement to the caller followed by providing an operator service to the caller.

15. The system of claim 14 wherein the operator service is a directory assistance service.

16. The system of claim 14 wherein the peripheral resource is coupled to the OSS.

17. The system of claim 16 wherein the peripheral resource is coupled to the service control point using User Datagram Protocol/Internet Protocol (UDP/IP) signaling.

18. The system of claim 10 wherein the OSS launches the first message based on an incoming call received on a defined trunk wherein the call indicates 411 as a called party number.

19. The system of claim 10 wherein the OSS is further configured to receive a third message comprising a directory number corresponding to a peripheral resource from the service control point, the OSS using the directory number to generate the first call leg.

20. The method of claim 1 wherein the second database is a wireless profile database, said wireless profile database being a database including;
    a service profile for each of a plurality of different wireless service providers, at least one of the service profiles including subscriber specific service information for each of a plurality of individual service subscribers.

21. A method for providing an information service comprising the steps of:
    receiving a query at a service control point from an Operator Services Switch (OSS), the query comprising a first data indicating receipt of a call received at the OSS from a wireless service provider, the query further comprising a second data indicating a called party number of the call;

determining an address in the service control point of an external database based on the first data and the second data;

transmitting a second query from the service control point to the external database using the address;

receiving a response at the service control point from the external database comprising a service script identifier;

determining a series of call handling instructions in the service control point associated with the service script identifier;

transmitting a first message to the OSS from the service control point based on the series of call handling instructions directing the OSS to connect the call with a first call leg to a peripheral resource;

transmitting a second message to the peripheral resource from the service control point based on the series of call handling instructions; and providing the information service to a caller using the peripheral resource connected to the first call leg.

22. The method of claim 21 wherein the called party number is 411.

23. The method of claim 21 wherein the second message transmitted to the peripheral resource indicates a selection of one of a plurality of announcements, wherein the plurality of announcements are associated with different languages.

24. The method of claim 21 wherein the determining the series of call handling instructions associated with the service script identifier is based on the wireless service provider.

25. The method of claim 24 wherein the determining the series of call handling instructions is further based on data stored in the external database provided by the wireless service provider.

26. The method of claim 25 wherein the determining the series of call handling instructions is further based on data stored in the external database provided by a carrier operating the OSS.

27. A non-transitory computer readable medium comprising executable instructions which when executed by a processor in a service control point cause the processor to perform a method, the method comprising the steps of:

processing a first message transmitted from an Operator Services Switch (OSS), the first message comprising a first data indicating receipt of a call at the OSS on a trunk connected to a wireless service provider and a second data indicating a called party number of the call;

determining an address of an external database by selecting one of a plurality of addresses based on the first data;

transmitting a second message comprising the second data to the external database using the address;

receiving a response from the external database comprising a service script identifier;

determining a series of call handling instructions stored in a memory based on the service script identifier;

transmitting a third message to the OSS directing the OSS to route the call to a peripheral resource; and transmitting a fourth message to the peripheral resource directing the peripheral resource to play a specific announcement.

* * * * *